Nov. 1, 1960 R. H. CARTER 2,958,296
VIBRATION ISOLATING COUPLING
Filed Aug. 17, 1955 2 Sheets-Sheet 1
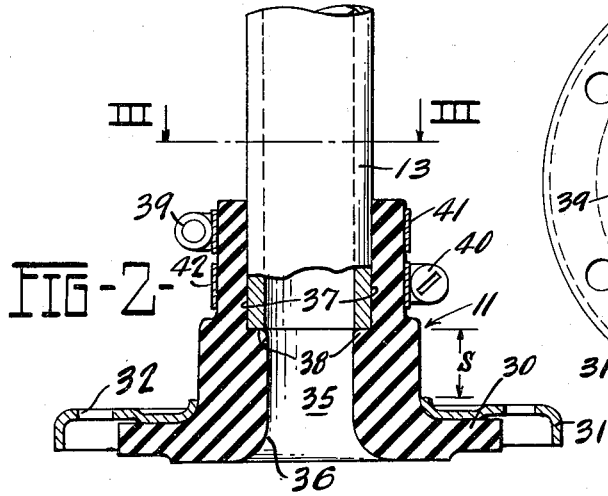
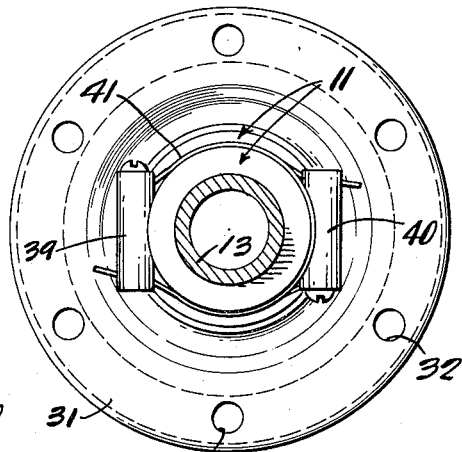
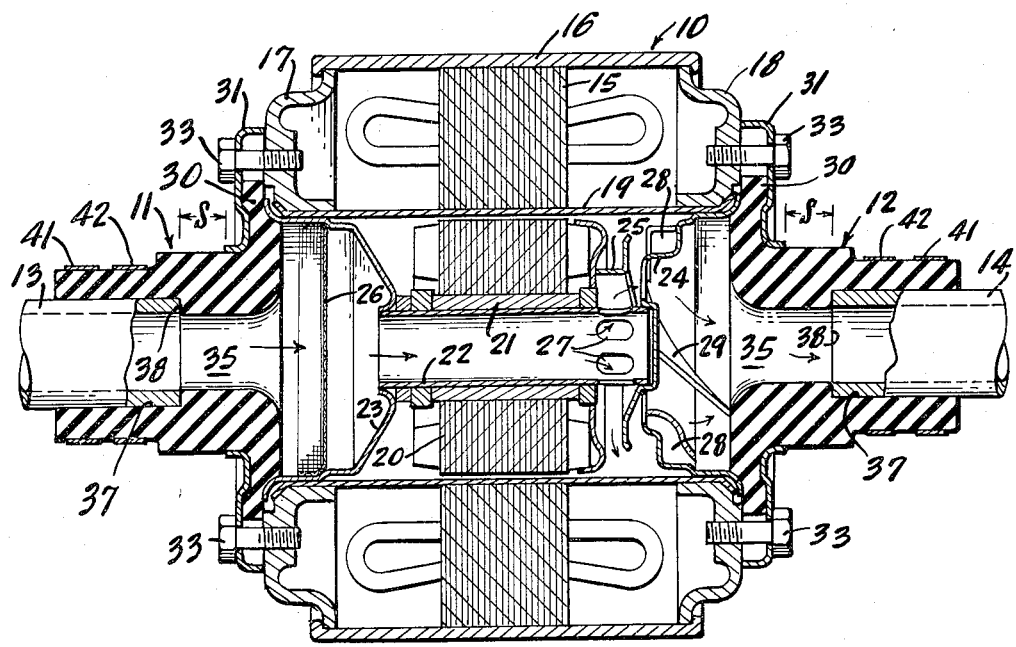
INVENTOR:
R. H. CARTER.
BY
Hugh A Kirk
ATTY.

Nov. 1, 1960   R. H. CARTER   2,958,296
VIBRATION ISOLATING COUPLING
Filed Aug. 17, 1955   2 Sheets-Sheet 2
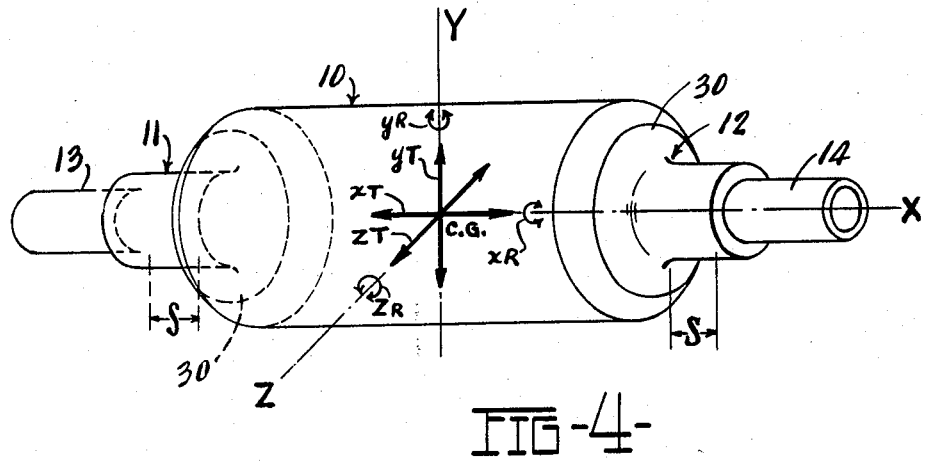
FIG-4-
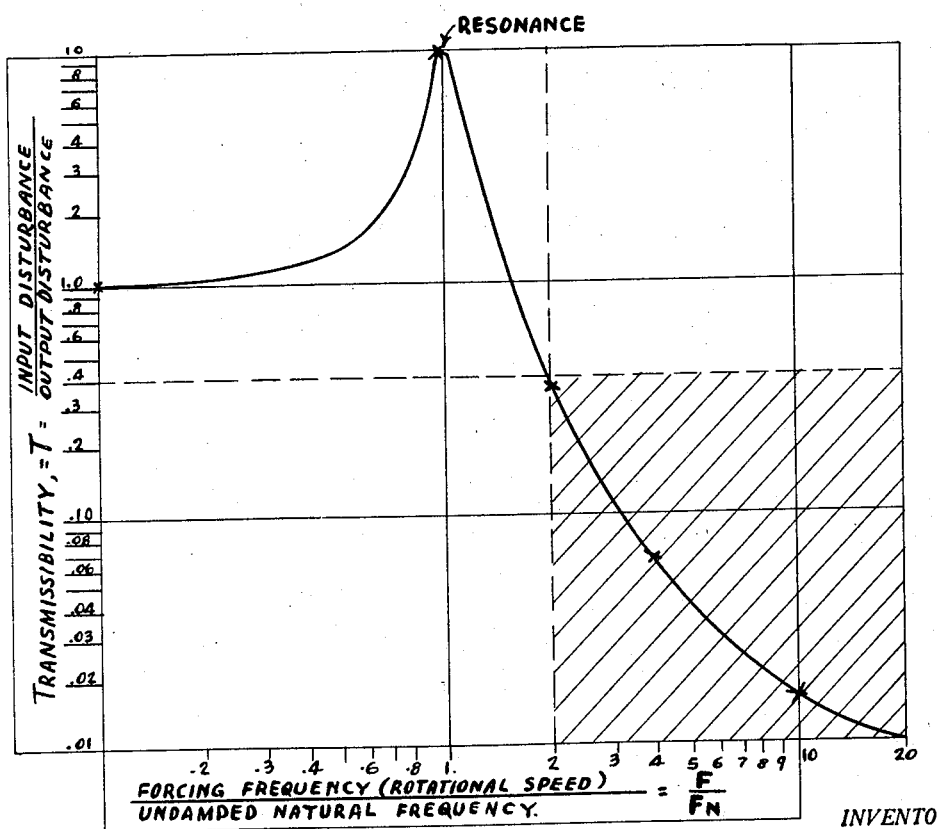
FIG-5-
INVENTOR:
R. H. CARTER.
BY
Hugh A. Kirk
ATTY.

2,958,296
VIBRATION ISOLATING COUPLING

Richard H. Carter, Fostoria, Ohio, assignor to The Fostoria Corporation, Fostoria, Ohio, a corporation of Ohio Filed Aug. 17, 1955, Ser. No. 528,938

9 Claims. (Cl. 103—218)

This invention relates to a vibration isolating coupling and support for a rotary pump. More particularly, it deals with such a coupling for the inlets and outlets of rotary circulating pumps from which the transmission of vibrations are very undesirable, such as from pumps connected to and in the hot water heating systems of homes and the like.

It is an object of this invention to greatly reduce the transmission of vibratory forces from a motor driven pumping unit to its pipe connections, which connections also completely support the vibrating unit.

Another object is to produce such a coupling which materially attenuates the magnitude of the vibrating forces transmitted to the piping from the motor driven pump resulting in the reduction of noise caused by vibrations in the piping.

Another object is to provide a coupling for supporting such a pump in a pipe, which coupling has unobstructed fluid flow between the inlets and outlets of the pump and the ends of the pipe to which it is connected.

Another object is to produce such a coupling of a moldable elastic material which is compact, is unaffected by temperatures up to 250° F., and is "soft" mechanically (i.e. having a low transmissibility to vibrations), but also is strong enough to withstand hydraulic pressures without ballooning or rupture and to support the weight of the pump connected thereto without bending and without being reinforced with either fabric or metal.

Another object is to provide such a coupling for a rotary pump which together with the mass of the pump to which it is connected has a natural frequency of substantially less than the rotational speed of the pump.

Another object is to provide such a coupling and vibrating mass supported thereby in which the majority of the vibrational forces of the first order approximation are applied as shearing forces to the coupling.

Generally speaking, the vibration isolating coupling and support for a rotary pump according to this invention comprises a pair of short tubular or annular elastic couplings or connectors which bridge a space between the ends of two pipes in a system to connect them to the corresponding adjacent inlet and outlet of the pump. These supporting couplings together with the mass of the pump must have a natural undamped frequency of vibration is any of its possible degrees of freedom of less than about one half and preferably less than one quarter of the rotational speed of the pump; or which couplings have a transmissibility, the ratio of input forces disturbances to output force disturbances, of less than 0.4. For attaching these annular couplings to the inlet and outlet of the pump, adjacent ends of each coupling may be flanged to fit under an annular ring plate which may be attached such as by bolts, to the corresponding end of the pump, while the other end of each coupling may be of sufficient size to fit over the end of the adjacent supporting pipe, and may be more tightly attached thereto by one or more hose clamps. These attaching means also insure pressurized fluid tight connections of the couplings to both the pump and the piping.

Although any rotary vibrating unit may be used, the type of rotary pump generally employed with the couplings of this invention, is a sealless pump in which the rotor of the motor is suspended in the fluid being pumped and the flow of the fluid is substantially axially through the pump with the inlet, outlet and pipe supporting ends all in axial alignment with each other. In this type of pump the center of gravity of its mass is on the connecting and supporting axis, thereby eliminating couples of the vibrational forces which occur in the vibrating system.

The elastic annular coupling itself is preferably made of uniform unreinforced moldable solid rubber which may have a damping ratio of about 0.05 and a hardness, according to the Shore Type A Durometer, of between about 45 and 70 and preferably about 60 (see "Engineering with Rubber" by Walter E. Burton (1949) McGraw Hill Co. page 26). This coupling has sufficient thickness to support the mass of the pump at any angle without objectionable deformation, and yet is sufficiently "soft" mechanically to absorb, mostly in shear, substantially all of the vibrations, hydraulic, mechanical and magnetic, that are produced by the operation of the pump. Thus, the actual dimensions of the coupling itself depend upon the above limitation of all its possible natural undamped frequencies of vibrations in combination with the mass of the pump, which must be less than half the rotational speed of the pump rotor, which thereby necessarily limit the length and the thickness of the coupling for any given pump mass and size of pump and pipes, including the pump inlet and outlet.

The above mentioned features and objects of this invention and the manner of attaining them will become more apparent and the invention itself will be best understood by reference to the following description of an embodiment of the invention taken in conjunction with the accompanying drawings, wherein:

Fig. 1 is a vertical cross section of a horizontally disposed sealless rotary pump connected to two aligned ends of pipe by similar separate supporting couplings according to one embodiment of this invention;

Fig. 2 is a slightly enlarged vertical section of one of the supporting couplings shown in Fig. 1 connected to an end of a pipe;

Fig. 3 is a plan view taken in the direction of the arrows along line III—III of Fig. 2 showing hose clamps for the connection of the coupling to the end of the pipe;

Fig. 4 is a schematic perspective view showing the three possible axes along and around which the six theoretical degrees of freedom of the pump and couplings of the type shown in Fig. 1 may occur, vectors showing the direction of the three translator and three rotational vibrational forces that operate on its center of gravity which is axially aligned with the connecting pipe ends and couplings along a horizontal axis; and Fig. 5 is a graph of the transmissibility of vibrations for a typical damping ratio of a single degree of freedom system on a logarithmic scale, which system is applicable for any one of the possible degrees of freedom of the pump and couplings shown by the vectors in Fig. 4, showing a shaded area for the frequency ratios of the systems suitable for the supporting couplings of this invention.

Referring specifically to Fig. 1 there is shown in vertical section an electric motor sealless pump 10 axially connected and supported by a pair of similar inlet and outlet coupling and supporting members 11 and 12 at opposite ends of the pump 10. These members 11 and 12 are connected at their outer ends to axially aligned spaced ends of rigid tubular ducts, fluid conduits or pipes 13 and 14 through which the fluid to be circulated by the pump 10 passes.

Although any type of a rotary pump may be employed as a circulator between the pipes 13 and 14, the specific embodiment shown herein to illustrate the supporting and couplings of the present invention is a sealless electric induction motor driven rotary pump having its center of gravity on its rotating axis which coincides with the aligned axis of the pipe ends 13 and 14. This particular symmetrical pump 10 comprises a stationary stator 15 in a housing 16 having end plates 17 and 18, which stator is completely separated by a thin non-magnetic sleeve 19 from a cylindrical rotor chamber in which a rotor 20 of the motor rotates around a graphite or carbon bearing 21 mounted on a fixed hollow fluid conducting shaft 22 supported at its ends by cup shaped supports 23 and 24 centered by and engaging the outer ends of the sleeve 19. At the right end of the rotor 20 is integrally mounted the pump impeller 25 which rotates therewith on the hollow shaft 22.

The fluid to be circulated thus passes in the direction of the arrows unobstructedly from the pipe end 13 through the coupling 11 and may be passed through a screen 26 before entering the hollow shaft 22 and thence out through the peripheral apertures 27, through the impeller 25, and thence through peripheral port ducts 28 in the cup support 24, and then guided by a deflector 29 to pass unobstructed through the outlet coupling 12 into the pipe end 14.

There are definite spaces S between the ends of the pipes 13 and 14 and the fastening means of the couplings 11 and 12 to the inlet and outlet faces or ends of the motor 10, which spaces S must be bridged by the annular laterally unsupported lengths of these couplings 11 and 12. These couplings thus must be sufficiently strong to support without objectionable deformation the weight or mass of the pump 10 on the rigid pipe ends 13 and 14, to withstand the fluid pressures in the pipes, couplings and pump without ballooning, and to resist temperatures up to about 250° F., as well as to be sufficiently flexible or "soft" mechanically to greatly attenuate the transmission of the many different types of vibrations, mechanical, magnetic and hydraulic, produced by the forces in operating the pump 10.

Referring more specifically to the means for fastening the couplings 11 and 12 to the motor pump 10 and to the pipes 13 and 14, reference now also will be had to Figs. 2 and 3. In the specific embodiment disclosed herein the coupling 11 or 12 may be provided with an integrally molded flange 30 radially extending outwardly around one end of each annular coupling, which flange may be engaged by a ring plate 31 having a plurality of apertures 32 therein through which screws or bolts 33 may be inserted and threaded into the end plates 17 and 18 of the stator housing 16 of the pump 10. These annular plates 31 may be formed so as to squeeze the flange portion 30 of the elastic coupling against the outer cups 23 and 24 to insure a fluid tight connection with the inlet and outlet of the pump. The central aperture 35 of each coupling adjacent the flange 30 may be bevelled or rounded at 36 to insure unobstructed fluid flow from and into the couplings 11 and 12, respectively. The other or outer end of each coupling 11 and 12 may be provided with a type of socket for a pipe end comprising a larger diameter cylindrical opening 37 than the duct portion 35, which ends in a shoulder 38 against which the end of the pipe 13 or 14 may engage to limit its movement inside of the flexible coupling and to insure the proper spaces S of unreinforced vibration damping material for each coupling member 11 and 12. Around this outer end or socket portion of the coupling, after the pipe 13 or 14 has been inserted therein to the shoulder 38, there may be placed a clamping means, such as one or more hose clamps 39 and 40 comprising, respectively, metal strips or bands 41 and 42 which may be contracted to squeeze the elastic outer tubular end portions of the coupling into fluid tight contact with the outer surface of the ends of the pipes 13 and 14. This coupling arrangement eliminates the necessity of molding threaded metal pipe couplings into or onto the members 11 and 12 and the corresponding threading of the ends of the pipes 13 and 14. However, other types or means of fastening the couplings with their laterally unsupported length portions S to the pump inlet and outlet and the pipe ends 13 and 14 may be used without departing from the scope of this invention.

In order to produce a proper length, thickness and hardness for the material in the laterally unsupported length portion S of the coupling 11 or 12 in combination with the mass and the vibrating forces of the pump 10, there are several different factors and types of vibration to consider which are illustrated schematically in Fig. 4, in which the two rigid pipe ends 13 and 14 are disclosed aligned along the X axis which also passes through the center of gravity C.G. of the mass of the pump 10, and perpendicular to each other and the X axis are also shown the Y and Z axes also passing through the center of gravity C.G. Along these three perpendicular axes there are possible three vibrational degrees of translatory freedom represented by the double arrowed vectors $x$T, $y$T and $z$T. The possible three vibrational degrees of rotational freedom are also represented by double arrowed arcuate vectors $x$R, $y$R and $z$R, around each of these axes, respectively. Since the center of mass C.G. is along the X axis, couples of forces in the system have been eliminated. Thus, one coupling or one side of one annular rubber collar may be compressed while the other or other side is stretched and vice versa respectively, and the couplings may be twisted in shear and moved sideways in shear. However, in considering these different force vectors on the portions S of the couplings 11 and 12, only the translatory vector $x$T effects compression or tension in its first order of approximation which may be mostly absorbed in shear in the flanges 30, while all five of the other vectors both translatory and rotational apply mostly shear to the portion S to which the material of the coupling is much more flexible and has a lower transmissibility, than it does for the compression and tension forces.

It is therefore important that the particular composition of the portion S and flanges 30 of each coupling is substantially uniform in structure and texture and that no stiffening or reinforcing materials be employed therein, either inside or outside, or embedded in the rubber or elastic material of the coupling itself, because of the many more vibrational forces which can be effectively and practically isolated in the shear of the rubber rather than in compression or tension which would be the case with rigid members surrounding the elastic material in the space S.

The damping effectiveness or transmissibility of the couplings 11 and 12 to any one of the different degrees of freedom of vibration is taken as a ratio of the force experienced upon their supports, namely the pipe 13 and 14, to the force acting upon the mounted body, or mass of the pump 10, which when in motion is directly proportional to the vibratory force transmitted from the mounted body or pump 10 to its support. This transmissibility T is related to the ratio of the undamped natural frequency $F_n$ of the mass of the body 10 and its couplings to the forcing frequency F applied to this mass 10 (which forcing frequency is directly proportional to the revolutions per second of the rotary pump), hereinafter called the frequency ratio, according to the following formula for the transmissibility of a substance having a known critical damping or damping ratio D:

$$T = \sqrt{\frac{1 + \left(2\frac{F}{F_n}D\right)^2}{\left(1 - \frac{F^2}{F_n^2}\right)^2 + \left(2\frac{F}{F_n}D\right)^2}} \quad (A)$$

If these and other values of T and $$\frac{F}{F_n}$$

are plotted for different values of forcing frequencies according to this Formula A for a substance having a damping ratio of 1/20 or 0.05 (which corresponds to that of natural rubber) and for a given mass or pump so that the value $F_n$ is constant, then the curve on logarithmic scales shown in Fig. 5 is obtained. Some specific values of T for different ratios of $$\frac{F}{F_n}$$

according to the above Formula A are given in the following table:

| Forcing Frequency (rotational speed) $\frac{F}{F_n}$ / Natural Undamped Frequency | Transmissibility = T |
| --- | --- |
| 0 | 1 |
| 1 | 10 |
| 2 | .38 |
| 4 | .075 |
| 10 | .015 |

From the above, when the natural frequency $F_n$ is equal to the forcing frequency F the transmissibility T is greatly increased and reaches a peak of ten times the forcing frequency, which is the point of resonance of the system for the material having a damping ratio of 0.05. Therefore, this condition of resonance must be avoided in all cases where damping or vibration isolation is sought.

Variations in the frequency ratio from 0 to 1.0 have comparatively little effect on the portion of the curve in Fig. 5 which corresponds to the couplings of this invention, namely, that portion shown within the shaded region to the lower right of Fig. 5 in which T has a value below about 0.4 and preferably below about 0.1 and the rotational speed per second or forcing frequency F is more than twice and less than about twenty times the undamped natural frequency $F_n$ of the vibrating mass or pump 10.

Any natural frequency $F_n$ for the mass 10 which is less than about 1/20th of F, and preferably less than 1/10th of F, would be impractical for the couplings of this invention, because such relatively small natural frequencies would produce too great a static deflection of the pump, in view of the following Formula B for static deflection d in inches:

$$F_n = 3.13\sqrt{\frac{1}{d}} \quad (B)$$

Accordingly, vibrating masses or pumps having a natural frequency of between one half and one sixth their forcing frequency or their rotational speeds, are within the most preferred ranges for the rubber like elastic couplings 11 and 12 of this invention.

*Example*

In a specific example of an 1/8 H.P. 110 volt, 60 cycle induction type electric motor sealless pump having a diameter of about 6¼" and a length overall including the couples of about 9" and a weight of approximately 20 pounds, it has been found with natural rubber couplings having a Shore Durometer hardness Type A of about 60 and portions S of about ¾" long and about ¾" thick, that the natural frequency $F_n$ of the pump is in the order of about 15 cycles per second, which compared with the forcing frequency F of a motor rotating at 1750 or 3500 r.p.m. is 292 or 583 cycles per second, respectively, which when divided by 15 c.p.s. is more than the lower limit of twice the forcing frequency, and that substantially reduced vibrations are transmitted into the pipes as 13 and 14 when it is so connected as shown in Fig. 1 from any one of the possible six degrees of freedom of the vibration for the motor pump 10. This particular coupling was found to withstand internal pressures of 100 pounds per square inch without ballooning, leaking or rupture.

While there is described above the principles of this invention in connection with specific apparatus, it is to be clearly understood that this description is made only by way of example and not as a limitation to the scope of this invention.

What is claimed is:

1. A vibration isolating and liquid tight supporting coupling for a rotary liquid pump unit mounted in a pipe wherein the unit has an outside dimension greater than the diameter of the pipe and has an inlet and an outlet axially spaced from and aligned with the two rigid ends of the pipe, said coupling comprising a pair of similar annular elastic couplings bridging the spaces between said pipe ends and said inlet and outlet, said elastic coupling including liquid tight connections from each pipe end to the coresponding pump inlet and outlet, said couplings including a short length of a laterally unsupported annular column of elastic material between said liquid tight connections.

2. A supporting coupling according to claim 1 whereby the natural vibration frequency of the pump mass supported by the coupling is less than the rotational speed of the pump.

3. A supporting coupling according to claim 1 wherein said liquid tight connection from said elastic material in each coupling to said pump inlet and outlet consists of clamping means.

4. A supporting coupling according to claim 1 including an outwardly extending peripheral flange of elastic material integral with and at one end of each said coupling of unsupported annular column of elastic material, an annular plate coextensive with one side of said flange of each coupling, and means for attaching said flanges around the corresponding inlet and outlet of said pump whereby said flanges are separately squeezed by said plates against the corresponding inlet and outlet ends of said pump to produce a liquid tight connection.

5. A supporting coupling according to claim 1 wherein said liquid tight connection from said elastic material in each coupling to said pipe ends consists of clamping means.

6. A supporting coupling according to claim 5 wherein said clamping means comprises a concentric annular socket of elastic material integral with said unsupported column of elastic material to receive said pipe end, and includes a hose clamp around said socket.

7. A supporting coupling according to claim 1 wherein said elastic coupling is of a uniform solid continuous moldable elastomer.

8. A vibration isolating coupling between an otherwise unsupported liquid pump unit and a rigid support therefor, said coupling comprising: a hollow cylinder of lesser diameter than the outside dimension of said unit and of elastic material subject to axial compression and tension forces and to transverse and rotational shearing forces from the vibrations of said unit, means for attaching opposite ends of said cylinder to said unit and said support, respectively, the axial space between said unit and said support being bridged only by said cylinder and being the only support for said unit between it and said support, the lateral flexibility and shear of said bridging material in said cylinder being such that the undamped natural frequency of the mass of said unit is less than the rotational speed of said rotating member.

9. A coupling according to claim 8 wherein said axis of rotation of said unit is coaxial with said cylindrical coupling.

References Cited in the file of this patent

UNITED STATES PATENTS

| | | |
| --- | --- | --- |
| 2,076,699 | Brown | Apr. 13, 1937 |
| 2,485,408 | Pezzillo | Oct. 18, 1949 |
| 2,535,695 | Pezzillo | Dec. 26, 1950 |
| 2,731,918 | Schaefer | Jan. 24, 1956 |
| 2,749,024 | Wilfert | June 5, 1956 |
| 2,753,806 | White | July 10, 1956 |